May 23, 1939.  J. N. SWARR  2,159,110
AUTOMATIC CONTROL FOR THERMAL SYSTEMS HAVING HEAT EXCHANGERS
Filed Dec. 4, 1936
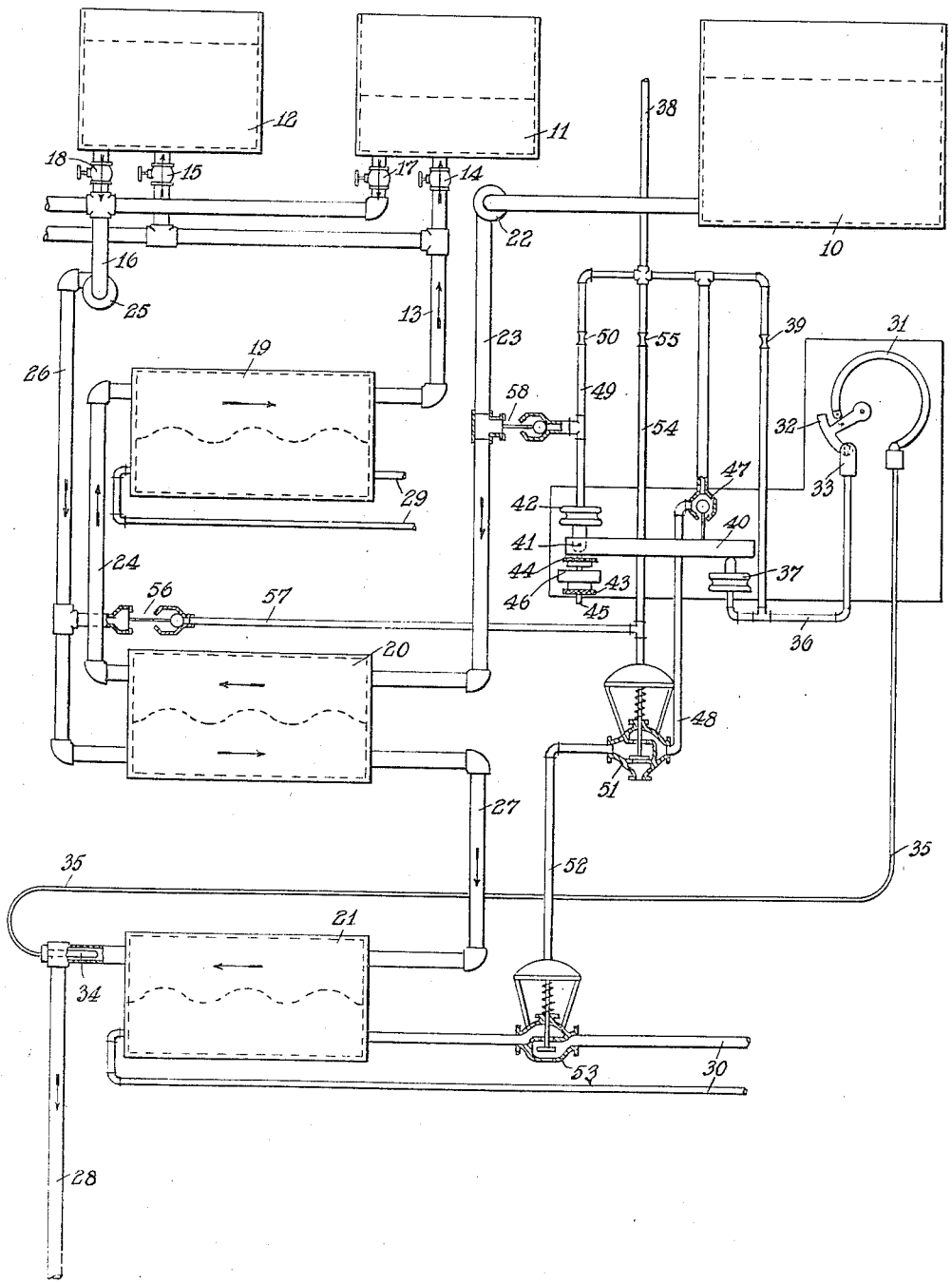
INVENTOR.
JAY N. SWARR
BY
ATTORNEY.

Patented May 23, 1939

2,159,110

UNITED STATES PATENT OFFICE 2,159,110

AUTOMATIC CONTROL FOR THERMAL SYSTEMS HAVING HEAT EXCHANGERS

Jay N. Swarr, Detroit, Mich., assignor to The Bristol Company, Waterbury, Conn., a corporation of Connecticut Application December 4, 1936, Serial No. 114,184

9 Claims. (Cl. 236—18)

This invention relates to the automatic control of the temperature of the liquid in systems having heat exchangers, and more particularly to systems utilizing a fluid which is subject to the transfer of heat from a plurality of sources, one of which is likely to undergo sudden and uncontrollable variations, and the other of which is required to compensate for said changes. As a practical example of such a system, consideration may be given to certain types of pasteurizers as used in the dairy industry. In these systems there is included a heat exchanger in which the temperature of an incoming stream of milk is raised by close thermal association with an outgoing stream, the former stream being adapted to have its temperature subsequently raised to a pasteurizing value by passage through a heat exchanger carrying steam as a heating agent, while the outgoing stream is to be cooled to bottling temperature in a further exchanger wherein circulates a stream of chilled brine or equivalent coolant.

In the operation of a system of the above nature there are present two sources of disturbance which tend to destroy the conditions of equilibrium existing during normal steady-state operation. The first of these occurs when changing the discharge from one to another of a plurality of holding tanks, at which time there invariably occurs an interval during which one tank is completely empty before it is time to empty the next in succession. This interval may vary from several seconds to several minutes. It will be appreciated that during this time there is no milk flowing through the exchanger in which the final cooling of the milk is effected; and, unless the brine circulation is at once reduced, the temperature in this particular exchanger may fall to the freezing point, introducing undesirable operating conditions.

The second source of disturbance, somewhat similar to the above-mentioned, but acting in an opposite sense, is found in the cessation of flow from the supply or raw milk tank. In this case, the cooling effect of the incoming stream upon the outgoing stream is removed, with the result that a sudden demand for an increased flow of brine is placed upon the final cooler or exchanger.

In an automatic control system of the conventional type, if the sensitivity and range of the control instrument be such as to maintain a satisfactorily delicate control of the temperature of the outgoing milk under normal operating conditions, it will be incapable of adaptation to the sudden and extreme fluctuations introduced by the above-mentioned cessations of flow. On the other hand, if the range of control of the temperature for the outgoing milk be extended sufficiently to meet these conditions, the control under normal operating conditions will be coarse and uncertain.

It is an object of this invention to provide means whereby, in a system having a delicacy of control suitable for normal steady-state operation of a pasteurizing process or the like, there may be superimposed upon the operating characteristic a quick-acting control of relatively wide range and of sufficient magnitude to meet and compensate for sudden flow changes, for example, of the nature above set forth.

The improved control system is characterized by the fact that a pneumatically-actuated regulating valve, subject to normal control on a basis of temperature of the outgoing liquid, has associated with the conduits through which control is effected additional valves whose action is subject to fluid pressure in the pipes carrying the liquid the temperature of which is to be controlled. The performance of these additional valves, furthermore, is such as to superimpose upon the normal control pressure rapid, and if necessary, wide, variations in response to changes in the pressure of the flowing liquid.

The single figure of the drawing is a representation, partly diagrammatic, of a control arrangement for a milk pasteurizing and cooling system and embodying the invention.

Referring to the drawing, 10 designates a raw milk tank, and 11 and 12 two holding tanks of a battery which may total six or more and adapted to retain milk at a pasteurizing temperature for a definite time period during which the process of pasteurization takes place. The said holding tanks 11 and 12 are placed in communication with an inlet pipe 13 by valves 14 and 15, respectively, and with an outlet pipe 16 by valves 17 and 18, respectively. The purpose of these valves is to control the distribution of milk among the several holding tanks; and their operation, which may be either manual or automatic, forms no part of the present invention.

Associated with the milk tanks are three heat exchangers, these being respectively a heater 19, a regenerator 20 and a cooler 21. The interconnection of these units is as follows: A circulating pump 22 is arranged to draw milk from the raw milk tank 10 and force it through a pipe 23 to the cold side of the regenerator 20, and thence through a pipe 24 to the cold side of the heater 19, and thence through the inlet pipe 13 to one or the other of the holding tanks, according to the setting of the valves 14 and 15. A pump 25 is arranged to draw milk from tank 11 or 12, according to the setting of valves 17 and 18, and force it through a pipe 26 to the hot side of the regenerator 20, and thence through a pipe 27 to the cooler 21, and thence through a pipe 28 to the outlet of the system.

Through the heater 19 circulates steam from piping system 29; and through the cooler 21 circulates brine or an equivalent coolant from a refrigerating system 30. With a combination as set forth above, it will be seen that the raw milk absorbs heat first in the regenerator 20, and is then brought up to a pasteurizing temperature by transfer of heat from the steam in the heater. The means by which a correct pasteurizing temperature is maintained is not shown, as it forms no part of the present invention. After leaving a holding tank, the pasteurized milk has its temperature materially reduced by transfer of heat to the incoming raw milk in the regenerator 20, after which it is cooled to a final temperature by transfer of heat to the brine in the cooler 21.

Control of the temperature of the outgoing pasteurized milk is effected by the following means: A control instrument (preferably of the type set forth in United States Letters Patent No. 1,880,247, granted October 4, 1932) embodying a pressure-sensitive element 31, a vane 32 operatively actuated thereby, and a cooperating stationary orifice member 33, is made responsive to temperature variations of the outgoing liquid by means of a bulb 34 fitted within the pipe 28 and having an expansive or volatile fluid within, and operatively connected to the pressure-sensitive element 31 by means of a capillary tube 35. The orifice member 33 is connected by a conduit 36 to an expansible bellows member 37, and compressed air is supplied to the said conduit and associated elements from a source 38 through a constriction 39.

The bellows 37 engages one end of a lever 40, the other end thereof having a movable fulcrum 41 positioned by an expansible bellows member 42. Movable nuts 43 and 44, threadedly engaging a screw 45 integral with said bellows member 42 and abutting against a fixed block 46, provide an adjustment of the limits of travel of said fulcrum, subject to the action of bellows 42. A three-way valve 47 of the supply-and-waste type, is connected to the air supply 38 and to a conduit 48, and has its stem operated by the lever 40 in such a manner that collapse of the bellows 37 tends to open the valve in a sense to admit air from the supply 38 to the conduit 48, while expansion of the bellows under internal fluid pressure tends to close communication between conduit 48 and the supply 38 and to vent the said conduit to the atmosphere. The bellows 42 is connected by a conduit 49 to the air supply 38 through a constriction 50, so that a decreased pressure within the conduit 49 tends to superimpose through the lever 40 to the valve 47 a movement in the same sense as that effected by expansion of the bellows member 37.

Conduit 48 communicates through the body of a diaphragm-operated three-way valve 51 with a conduit 52 leading to the diaphragm of a reverse-acting regulating valve 53 included in the brine-circulating system, so that an increase of pressure in the conduit 52 tends to open said valve 53 and vice versa. The body connection of valve 51 is such that with air pressure upon its diaphragm conduits 48 and 52 are directly in communication, while, upon release of pressure upon the diaphragm, the valve moves to a position where conduit 48 is shut off from conduit 52 and the latter vented to the atmosphere. The diaphragm of valve 51, moreover, is arranged to receive air pressure from a conduit 54 communicating with the supply 38 through a constriction 55.

A fluid-pressure-actuated valve 56 is connected to the pipe 26 for actuation by fluid pressure therein, and has its body connected by a conduit 57 to the conduit 54 in a sense that when pressure exists in said pipe 26, the valve 56 will be moved to an open position, venting conduit 57 to the atmosphere, and causing the pressure applied to the diaphragm of valve 51 to fall to a minimum.

A fluid-pressure-actuated valve 58 is connected to the pipe 23 for actuation by fluid pressure therein, and has its body connected to conduit 49 in a sense that when pressure exists in said pipe 23 the valve is open, venting the conduit to the atmosphere, and making it impossible for air bleeding into said conduit from the supply 38 through the constriction 50 to build up a pressure in the conduit, thereby causing the bellows 42 to remain in a collapsed condition. Upon failure of pressure in pipe 23, however, the valve 58 will be actuated to its closed position, interrupting the wastage of air from the conduit 49, permitting pressure to build up in the bellows 42, and causing it to actuate the lever 40 in the manner hereinabove set forth.

The operation of the control system under steady-state conditions is as follows: Consider the valves 14 and 18 as being open and the valves 15 and 17 as closed, and a flow of milk established from the raw milk tank 10 through the regenerator 20 and the heater 19 into the holding tank 11. At the same time, milk from the holding tank 12 may discharge through the regenerator to the cooler 21 and to the outlet pipe 28. Under these conditions pressures in the pipes 23 and 26 will be such as to maintain valves 58 and 56 in open and closed positions, respectively.

With valve 58 open, the constriction 50 between conduit 49 and the supply 38 will prevent pressure building up in said conduit, so that the bellows 42 will be collapsed, maintaining the fulcrum 41 of lever 40 at its topmost position as determined by the setting of nut 43 on screw 45. With valve 56 closed, air pressure from the supply 38 will be built up in conduits 57 and 54, depressing the diaphragm of valve 51 and providing a through communication between conduits 48 and 52.

Variations in temperature of the outgoing stream of milk in the pipe 28 will act through the sensitive bulb 34, the capillary tube 35, and the pressure-sensitive member 31, to cause variations in the position of the vane 32 relatively to the orifice member 33. For example, an increase of temperature in the outgoing milk stream will cause the vane 32 to be moved in a sense to open the orifice 33 permitting an increased quantity of air to bleed to the atmosphere. Because of the constriction 39 between the conduit 36 and the supply 38, the pressure in conduit 36 and also in the bellows 37 will be reduced, so that the bellows will collapse to a corresponding degree, lowering the right-hand end of lever 40 and shifting the stem of pilot valve 47 in a sense to close the vent therefrom and admit air from the supply 38 to the conduit 48 and thence through the valve 51 and the conduit 52 to the diaphragm of reverse-acting regulating valve 53. Increase of pressure in the diaphragm of valve 53 will cause it to be opened, allowing a freer circulation of brine in the cooler 21, thus tending to reduce the temperature of the outgoing liquid. Conversely, a lowering of temperature in the outgoing milk will react upon the control system in a sense to decrease the flow of brine and restore the temperature to the normal value. The control operation, as thus far described, is well known in the art, and forms no essential part of the present invention.

In the event of cessation of the flow of outgoing milk through the cooler 21, as may occur at times of changing from one to another of the holding tanks, the temperature within the cooler may fall very rapidly; and, with the pipe 28 empty of liquid, this fall of temperature cannot be communicated to the bulb 34, and thence to the control system, with sufficient rapidity to reduce the brine circulation by normal means, as provided in the control as hereinabove set forth. With the novel arrangement, however, the cessation of milk flow will be reflected in a loss of pressure in the operating element of valve 56, with the consequent opening of this valve, whereupon air will be vented from conduits 57 and 54, lowering pressure on the diaphragm of valve 51, which will at once revert to a position to interrupt communication between conduits 48 and 52 and vent the latter to the atmosphere. Regulating valve 53 will at once move to its closed position, shutting off the brine circulation, and preventing undesirably low temperatures in the cooler 21. Upon restoration of pressure in the pipe 26, the valve 56 will again assume its closed position, and normal control conditions will be restored.

In the event of cessation of the flow of raw milk in pipe 23, as might be occasioned by emptying of the tank 10, the valve 58 will lose pressure and will move to its closed position, allowing air pressure from the supply 38 through the constriction 50 to build up in the conduit 49 and associated bellows member 42, which will expand, moving the fulcrum 41 of lever 40 to its lowermost position, as determined by the setting of nut 44 on screw 45. This will effect superimposing upon the valve 47 of an influence tending to raise the pressure in conduits 48 and 52 and increase the flow of brine in the cooler 21.

By suitably proportioning and adjusting the elements of this superimposed control, the ultimate result will be one of resetting the control point to an extent to offset the loss of cooling influence of the incoming raw milk in the regenerator 20, and maintaining a correct outgoing temperature at the bulb 34. Upon restoration of flow of the raw milk stream, pressure upon the valve 58 will cause it to open, reducing air pressure in the conduit 49 and bellows 42, whereupon the fulcrum 41 of the lever 40 will revert to its uppermost position, as determined by the setting of nut 43 on the screw 45, and normal control will be restored.

I claim:

1. The combination with a system for automatically regulating the temperature of a flowing liquid to be submitted to a thermal treatment and including a pair of heat exchangers having thermally associated liquid compartments, one of said exchangers being adapted for imparting heat to the liquid from a relatively hot fluid prior to said treatment and the other for removing heat therefrom and to a relatively cool fluid subsequent to said treatment; a source of liquid supply and means to circulate the said liquid therefrom through the heat exchangers for final discharge from the heat-removing exchanger, and means to control the intensity of the cooling effect of said latter exchanger; of means subject to such a condition of the liquid flow beyond the first-named exchanger as would affect the flow of liquid in different compartments thereof for modifying the action of the means controlling the intensity of the cooling effect.

2. The combination with a system for automatically regulating the temperature of a flowing liquid to be submitted to a thermal treatment and including a pair of heat exchangers having thermally associated liquid compartments, one of said exchangers being adapted for imparting heat to the liquid from a relatively hot fluid prior to said treatment and the other for removing heat therefrom and to a relatively cool fluid subsequent to said treatment, a source of liquid supply and means to circulate the said liquid therefrom through the heat exchangers for final discharge from the heat-removing exchanger, and means to control the intensity of the cooling effect of said latter exchanger; of means subject to a condition of the liquid flow entering one compartment of the first-named exchanger for modifying the action of the means controlling the intensity of the cooling effect; and additional means subject to a condition of the liquid flow entering another compartment of the first-named exchanger for modifying the action of said means controlling the intensity of the cooling effect.

3. In a pneumatic control system for regulating the temperature of a flowing liquid and including a valve adapted to vary the flow of a heat-bearing agent: a member sensitive to changes in temperature of said liquid, pneumatic control means responsive to said sensitive member for controlling the valve, a conduit connecting said control means and said valve, a valve in said conduit, pneumatic means for maintaining said second-named valve in a position to establish free communication in said conduit between said control means and said first-named valve, a fluid-pressure operated valve subject to operation by the pressure of said flowing liquid and normally maintained thereby in a closed position, a conduit connecting said last-named valve to said pneumatic means, whereby upon release of pressure of said flowing liquid said pneumatic means will be rendered ineffective and operative communication between said control means and said first-named valve interrupted.

4. In a control system including heat exchangers in one of which heat is transferred from an outgoing heated liquid to an incoming cool liquid and in another of which further heat is transferred from said outgoing liquid to a liquid cooling agent, and a valve for controlling the flow of said cooling agent: regulating means acting upon said valve to maintain a predetermined value of final temperature in said outgoing liquid; means superimposed upon said controlling valve and acting therethrough to increase the flow of said cooling agent upon a cessation of flow of said incoming liquid, and further means for reducing the flow of said cooling agent upon a cessation in flow of said outgoing liquid.

5. In a control system including heat exchangers having thermally associated compartments in one of which heat exchangers heat is transferred from an outgoing heated liquid in one compartment to an incoming cool liquid in another compartment and in another of which exchangers further heat is transferred from said outgoing liquid to a liquid cooling agent, a pipe for conveying said incoming liquid to the first of said compartments and a pipe for conveying said outgoing liquid to the second of said compartments, means for conveying said outgoing liquid into and out of the second of said exchangers and an element sensitive to the temperature of said outgoing liquid: an expansible hollow member, means for maintaining in said hollow member a fluid pressure representative of said temperature, a second hollow member, a source of supply of compressed air, a valve connected to said source and subject to pressure in said first-named pipe whereby a pressure of air from said source in said second-named hollow member is definitely associated with presence or absence of pressure in said pipe, differential means operated jointly by the said two hollow members, a pilot valve actuated by said differential means, a pneumatically actuated control member for regulating the flow of said cooling agent, a source of air supply for the same, and a conduit operatively connecting said pilot valve and said control member, a valve in said conduit, pneumatically operable to establish or interrupt said operative connection between said pilot valve and control member, a valve connected to said air supply and subject to pressure in said second-named pipe, whereby the pneumatically operable valve may be made responsive to presence or absence of pressure in said second-named pipe.

6. In a temperature regulating system for a flowing fluid undergoing a treatment, and embodying a principal heat exchanger in which heat is regeneratively communicated between thermally associated streams of said fluid before and after undergoing said treatment, and a marginal heat exchanger wherein the final temperature of said fluid is regulated by thermal association with a heat-bearing agent: means subject to said final temperature for controlling said heat-bearing agent, and means subject to an influence affecting the relative flow of said streams of fluid for modifying the action of said controlling means.

7. In a system for controlling the final temperature of a flowing fluid by successive thermal association with a first and unregulated heat-bearing medium and a second and regulated heat-bearing medium: means sensitive to the final temperature of said fluid and tending to regulate said second heat-bearing medium, and means subject to a condition of the fluid flow in a portion of the system adapted to modify the performance of said regulating means, together with means subject to a condition of the unregulated heat-bearing medium for superimposing a control on said regulating means.

8. In a system for controlling the final temperature of a flowing fluid by successive thermal association with a first and unregulated heat-bearing medium and a second and regulated heat-bearing medium: means sensitive to the final temperature of said fluid and tending to regulate said second heat-bearing medium, and means subject to the pressure of the fluid flow in a portion of the system adapted to modify the performance of said regulating means, together with means subject to the pressure of the unregulating heat-bearing medium for modifying the control on said regulating means.

9. In a system for controlling the final temperature of a flowing fluid by successive thermal association with a first and unregulated heat-bearing medium and a second and regulated heat-bearing medium: means sensitive to the final temperature of said fluid and tending to regulate said second heat-bearing medium, and means subject to a condition of the fluid flow in a portion of the system in advance of the association with the regulated heat-bearing medium and adapted to modify the performance of said regulating means, together with means subject to a condition of the unregulated heat-bearing medium for superimposing a control on said regulating means.

JAY N. SWARR.